United States Patent
Cox

(10) Patent No.: US 10,464,498 B2
(45) Date of Patent: Nov. 5, 2019

(54) QUICK ACCESS ATV MOUNTED BOW CARRIER

(71) Applicant: Michael Cox, Vernal, UT (US)

(72) Inventor: Michael Cox, Vernal, UT (US)

( * ) Notice: Subject to any disclaimer, the term of this patent is extended or adjusted under 35 U.S.C. 154(b) by 0 days.

(21) Appl. No.: 15/973,122

(22) Filed: May 7, 2018

(65) Prior Publication Data
US 2018/0319349 A1 Nov. 8, 2018

Related U.S. Application Data

(60) Provisional application No. 62/503,152, filed on May 8, 2017.

(51) Int. Cl.
*B60R 9/08* (2006.01)
*F41B 5/14* (2006.01)
*B60R 7/14* (2006.01)
*F41B 5/10* (2006.01)

(52) U.S. Cl.
CPC ............... *B60R 9/08* (2013.01); *B60R 7/14* (2013.01); *F41B 5/1453* (2013.01); *F41B 5/10* (2013.01)

(58) Field of Classification Search
CPC .......... B60R 9/08; B60R 9/055; B60R 9/065; B60R 7/14; F41B 5/1453; F41B 5/1457; F41B 5/1461; Y10S 224/913; Y10S 224/916
See application file for complete search history.

(56) References Cited

U.S. PATENT DOCUMENTS

| | | | | |
|---|---|---|---|---|
| 7,648,025 | B1* | 1/2010 | Gregory | B60R 7/14 206/315.11 |
| 9,840,205 | B1* | 12/2017 | Marquez | B60R 9/02 |
| 2004/0251288 | A1* | 12/2004 | Hancock | B60R 7/14 224/401 |
| 2011/0114687 | A1* | 5/2011 | Wellborn | B60R 7/14 224/401 |
| 2013/0284780 | A1* | 10/2013 | Beckwith | B60R 7/14 224/401 |
| 2016/0265867 | A1* | 9/2016 | Voigt | F41B 5/1457 |
| 2016/0348998 | A1 | 12/2016 | Morrill et al. | |

* cited by examiner

*Primary Examiner* — Corey N Skurdal
(74) *Attorney, Agent, or Firm* — Bretton L. Crockett; TechLaw Ventures, PLLC

(57) ABSTRACT

Bow carriers for use with ATVs and to related methods and systems. In a first illustrative embodiment, a carrier is formed as a box having generally planar front and back sides. At an upper end, the carrier may have an open top and taper to a narrower bottom. The box may be lined with a cushioning material, such as a compressible foam, on either long side with relatively limited space therebetween. The cushioning material may be covered with a suitable textile. The exterior of the box may include hooks and straps or other suitable hardware for attachment to an ATV cargo rack. The open top may be covered by a lid or retractable flap. For use, a bow may be placed in the carrier, into the space between the oppositely mounted cushioning lining. The lining may then be partially compressed to retain the bow securely and safely therein.

20 Claims, 6 Drawing Sheets

US 10,464,498 B2

QUICK ACCESS ATV MOUNTED BOW CARRIER

CROSS-REFERENCE TO RELATED APPLICATION

This application claims the benefit of U.S. Provisional Application No. 62/503,152, filed May 8, 2017, the disclosure of which is incorporated herein by reference in its entirety.

TECHNICAL FIELD

The present disclosure relates to carriers for bows for use with all-terrain vehicles.

BACKGROUND

ATVs are often used for transportation for recreational hunting. Securely transporting a bow on an ATV has typically required securing it to a cargo rack, either by a mounting system or strapped directly thereto. However, these either leave the bow exposed to the elements during transport and/or make it difficult to retrieve it quickly if needed.

A system or device that protected the bow but allowed for quick access to it would be an improvement in the art. Such a system that left the ATV cargo rack open for other usage would be a further improvement in the art.

SUMMARY

The present disclosure is directed to a bow carrier for use with ATVs and to related methods and systems. In a first illustrative embodiment, a carrier is formed as a box having generally planar front and back sides. At an upper end, the carrier may have an open top and taper to a narrower bottom. The box may be lined with a cushioning material, such as a compressible foam, on either long side with relatively limited space therebetween. The cushioning material may be covered with a suitable textile. The exterior of the box may include hooks and straps or other suitable hardware for attachment to an ATV cargo rack. The open top may be covered by a lid or retractable flap. For use, a bow may be placed in the carrier, into the space between the oppositely mounted cushioning lining. The lining may then be partially compressed to retain the bow securely and safely therein.

DESCRIPTION OF THE DRAWINGS

It will be appreciated by those of ordinary skill in the art that the various drawings are for illustrative purposes only. The nature of the present disclosure, as well as other embodiments in accordance with this disclosure, may be more clearly understood by reference to the following detailed description, to the appended claims, and to the several drawings.

DETAILED DESCRIPTION

Figure 1:
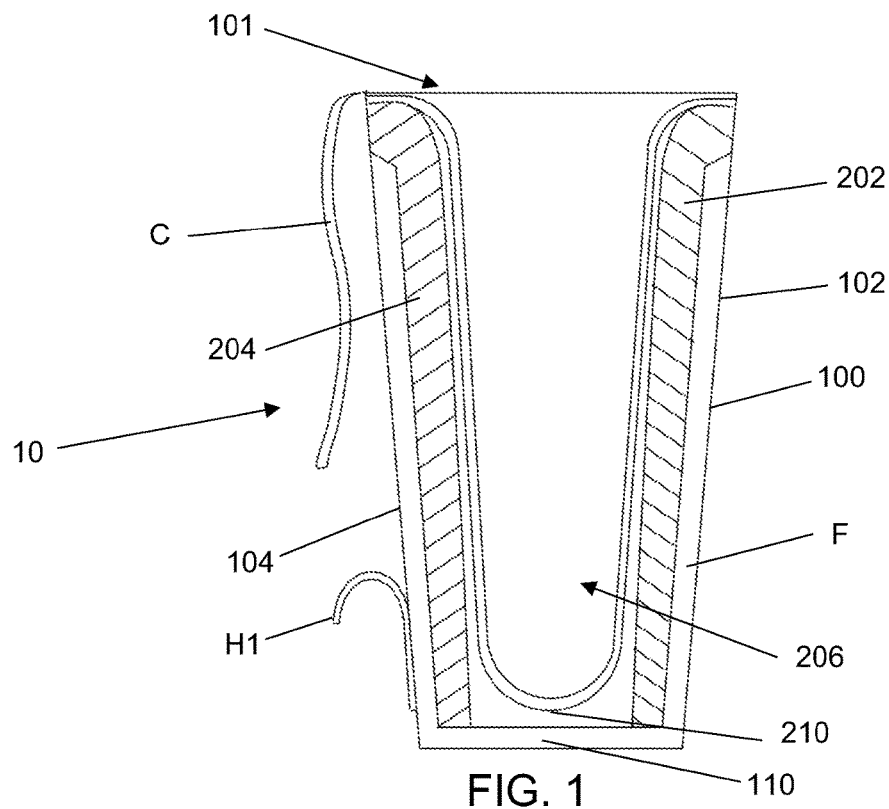
FIG. 1 is a side sectional view of a first embodiment of an ATV mountable bow carrier in accordance with the present disclosure, showing the structural details thereof.

It will be appreciated by those skilled in the art that the embodiments herein described, while illustrative, are not intended to so limit this disclosure or the scope of the appended claims. Those skilled in the art will also understand that various combinations or modifications of the embodiments presented herein can be made without departing from the scope of this disclosure. All such alternate embodiments are within the scope of the present disclosure.

Turning to FIGS. 1, 2A, 3A, and 4, a first illustrative embodiment of an ATV mountable bow carrier system 10 is depicted. As depicted, the carrier 10 may be formed as a box 100 with an open top 101, having a generally planar front side 102 and an opposite generally planar back side 104. As depicted, the front side 102 may angle from a narrower bottom to a wider top 101 of the box 100, with back side 104 being generally orthogonal to the bottom. Left and right sides 106 and 108 run along the edges of the front and rear sides from the open top 101 as the box tapers to a narrower closed bottom 110. As depicted, the narrower bottom side 110 may be generally planar as well, but in other embodiments, may have differently shaped bottoms, as for storage or to facilitate attachment to certain ATV cargo racks. For example, with an extended bottom, a port could be located in rear side 104 to allow for access to a lower space in the box 100 allowing access under the bow for additional storage.

Figure 2A:
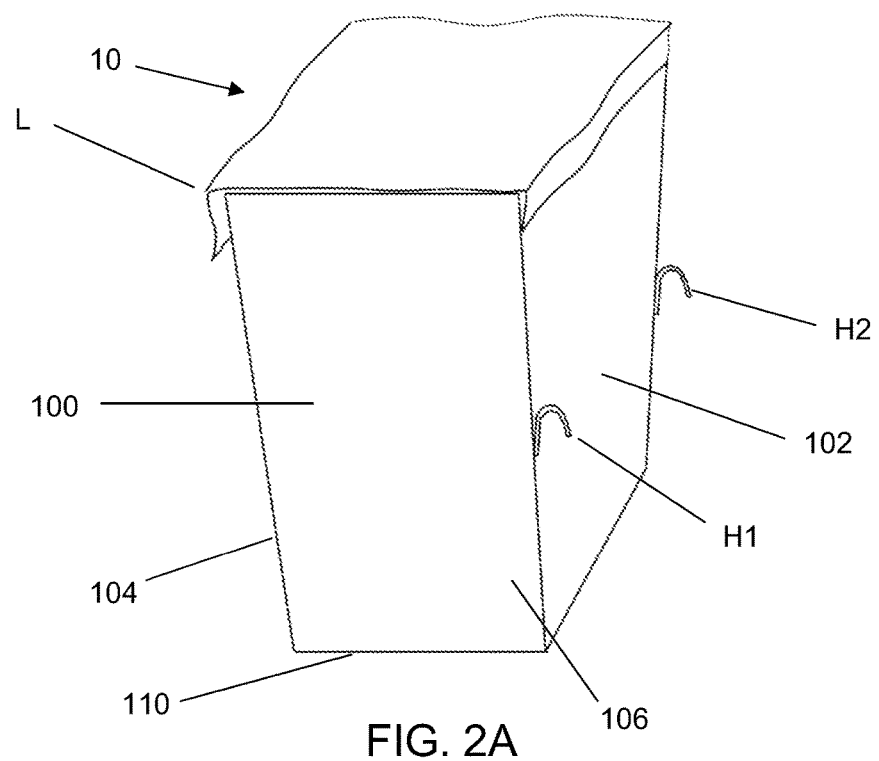
FIGS. 2A and 3A are side and rear views of an embodiment constructed according to the schematic of FIG. 1.
Figure 2B:
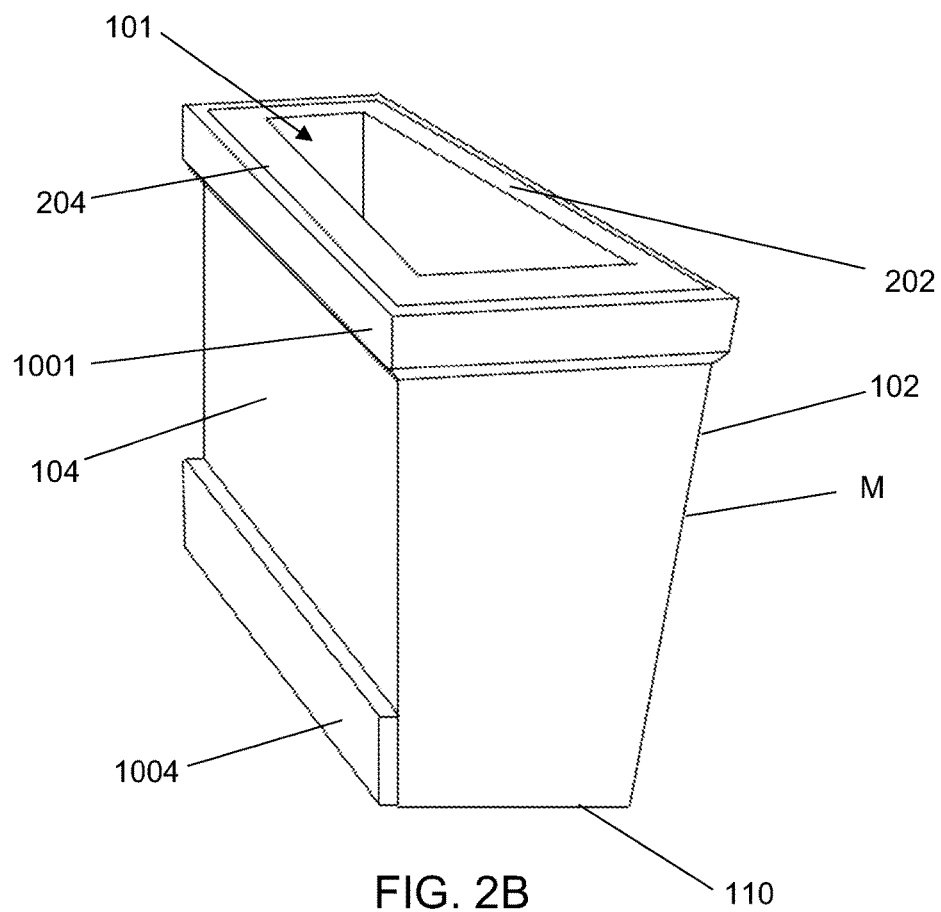
FIGS. 2B and 3B are side and rear views of a second embodiment of an ATV mountable bow carrier.
Figure 3B:
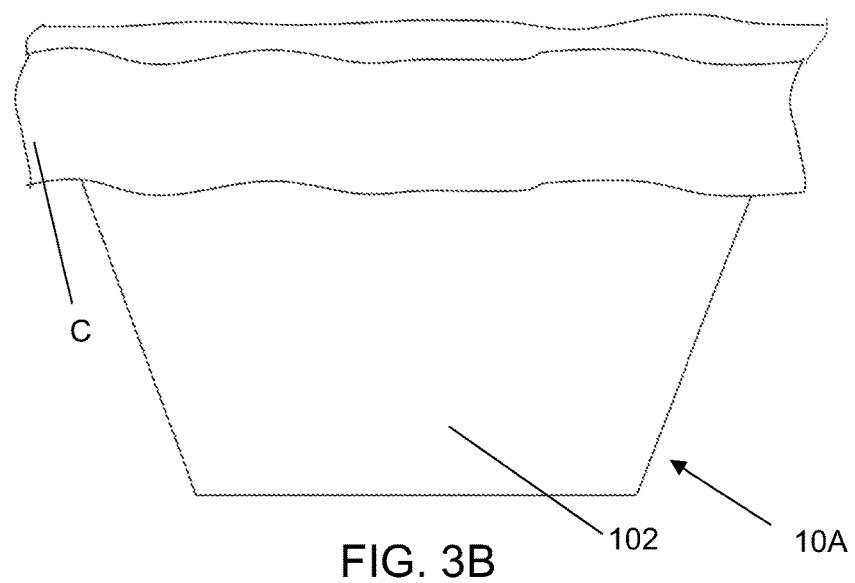
Figure 3A:
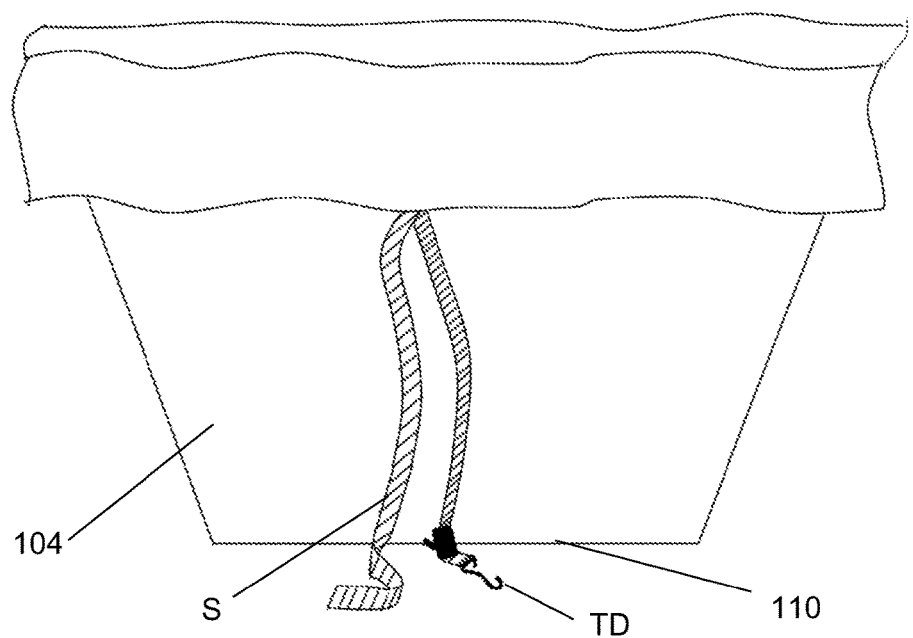
Figure 4:
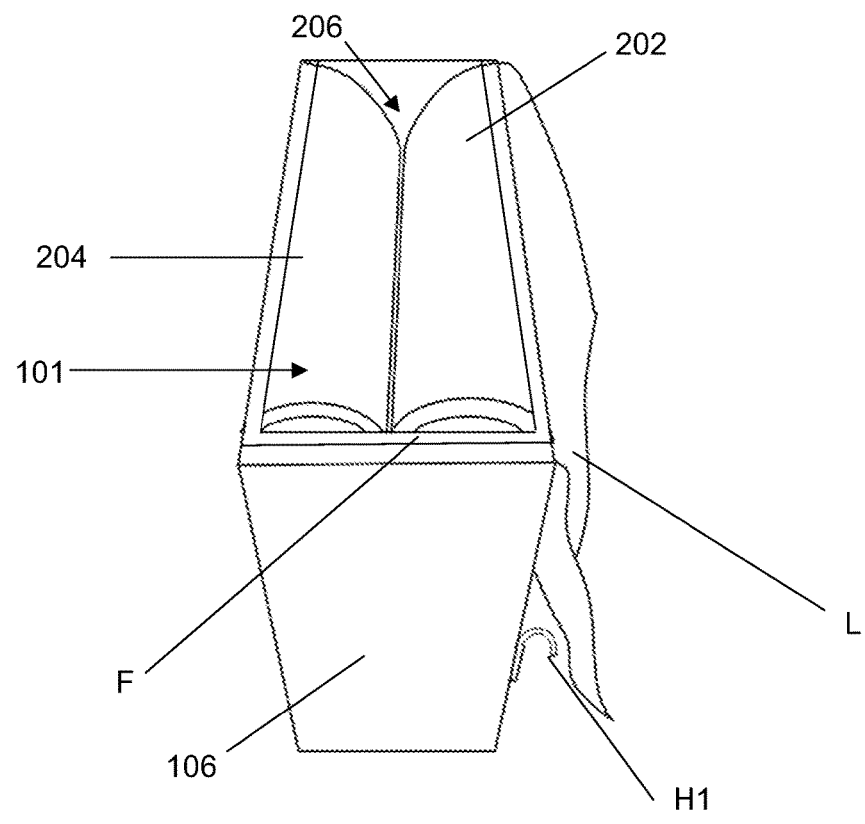
FIG. 4 is a top side view of the embodiment of FIGS. 2 and 3 showing structural detail therein.

Turning to FIGS. 2B and 3B, a second embodiment of a carrier system 10A is depicted. Like elements are numbered the same as with system 10. It will be noted that the front face 102 of the box 100 of this second system is angled away from the bottom 110 along its length. Further, the rear face 104 may include an upper portion formed of a thinner layer of material with a thicker bottom portion 1004 and an upper outer rim 1001. The thicker bottom portion and the upper outer rim may be formed from thicker layers of material in order to provide secure connection points for the attachment structures, cushioning and cover flap as discussed further herein. For example, the thicker bottom portion 1004 and upper outer rim 1001 could be relatively thicker wooden boards where the remaining materials of the side faces are thinner sheets of plywood. Such embodiments may not require a separate internal framework.

The box 100 may be sized for storage of a compound bow used for hunting with the width of the open top and distance between front and rear sides 102 and 104 set accordingly. Similarly, the angle of the taper from the top 101 to the bottom 110 may be set to accommodate the curve of a bow inserted into the carrier 10.

In the depicted embodiments, the box 100 exterior surfaces may be constructed of a suitable sheet material, such as plywood. For example, a ¼-inch thick exterior grade plywood may be used. Where present, an internal framework F constructed from elongated members, such as wooden framing may be used to provide support to which the exterior panels are attached. It will be appreciated that the assemblies depicted herein may be constructed from any suitable materials. For example, rotationally molded or injection molded plastics and other polymers for certain components could be used. Similarly, suitable metals such as sheet steel or metal framing may be sued where appropriate. The exterior surface of the box 100 may be coated with a protective layer, such as a sprayable plastic material M for durability and water resistance as depicted in FIGS. 2B and 3B.

In other embodiments, the framework F could be external to the box 100. For example, where the box could be formed of molded plastic is could be placed in an external framework that attaches to an ATV as discussed further below.

A cover C may be used to close the open top 101 of box 100. As schematically depicted in FIG. 1, cover C may be a simple flap, such as a flap of water resistant textile, such as oil cloth or a tarping material, attached along one side that may be pulled over the opening and extend down the other side to provide cover while facilitating quick access to the carrier. Alternatively, it could be a hinged lid that may be attached to the box 100 using suitable hinges and fasteners and could include a latch.

Internally, the box 100 may be lined with a cushioning material, such as a compressible foam, on either long side with relatively limited space therebetween. In the depicted embodiment, there are opposite front and rear foam linings 202 and 204, respectively, extending along the interior surfaces of the front and rear sides of the box 100. As shown, these foam linings may be attached to the box sides along the vertical length of the box or may be attached near a top edge to the framework F and then may wrap thereover to extend downwards into the box 100 interior with the same face of the linings attached to the box sides at the top portion and facing one another along the length of the cavity. It will be appreciated that in other embodiments, different forms of attachment may be used as may be advantageous.

The foam linings 202 and 204 may be separated by a gap 206. Each of the foam linings may be covered with a suitable textile. In the depicted embodiment, each foam lining may be covered by separate upholstery to protect the foam from tearing during use. In other embodiments, rather than separately upholstered foam linings on either sides, a separate flap of material, L may be placed over the linings 202 and 204 and inserted therebetween to form a pocket during use as depicted in FIG. 1.

Figure 5:
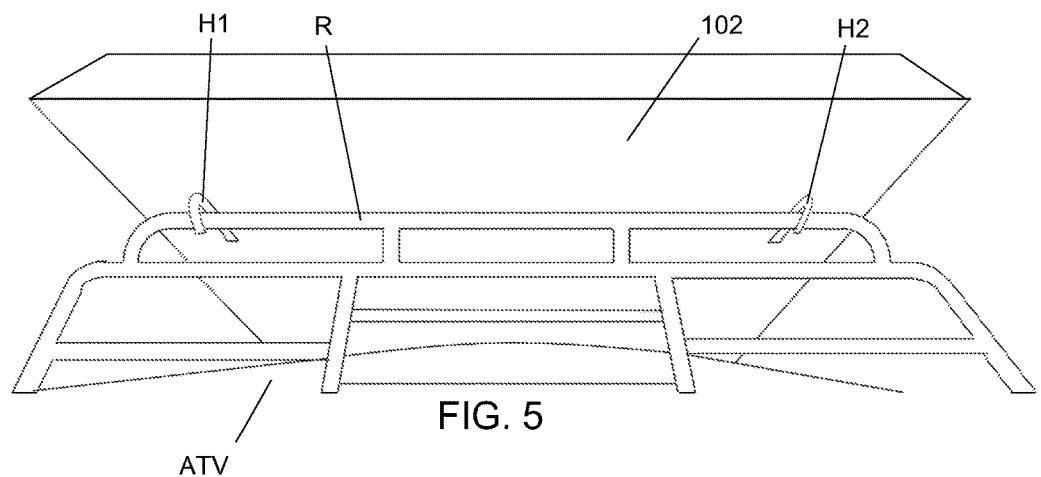
FIGS. 5 and 6 are close front and rear views of portions of the exterior of the embodiment of FIGS. 2A, 3A and 4, mounted on an ATV cargo rack.
Figure 6:
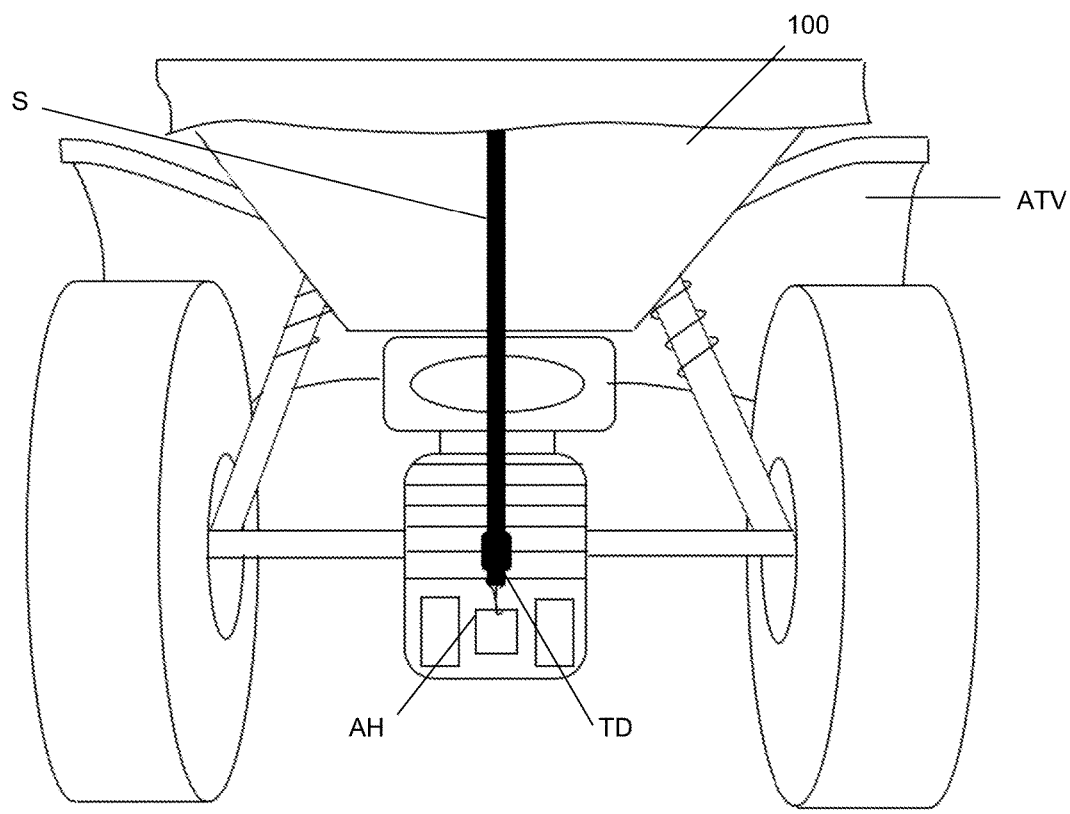

The exterior of the box may include hooks and straps or other suitable hardware for attachment to an ATV cargo rack. In the depicted embodiment, there are two hooks H1 and H2 disposed on the front surface of the carrier in a lower portion thereof. There is also a strap S with a tie down assembly TD attached to the rear surface 104 using a suitable bracket. As shown in FIGS. 5 and 6, the carrier 10 may be attached to a cargo rack R on an ATV by placement of the hooks H1 and H2 over a tube forming the rack, such as the rear most edge of the rack R. The front surface 102 faces the rack and the carrier sits behind the rack R extending downwards therefrom. The strap S may be secured to the ATV at a suitable location, using the tiedown assembly TD. In the depicted embodiment, this is shown by attachment of the tiedown TD to a hitch AH on the ATV. It will be appreciated that other suitable tensioners, and attachment features may be used to secure the carrier to the an ATV. For example, the tiedown assembly may consist of a hook that may be attached to a portion of the ATV frame or hitch AH and a tensioner for tightening the strap S which are separately disposed on the strap S, although any suitable tiedown assembly may be used. The placement of an attached carrier off the cargo rack R leaves the cargo rack R free to carry other equipment during use.

In another example, where framework F is external to the box 100, the connection structures, such as hooks H1 and H2, may be disposed on the frame itself. For example, where the frame is formed from metal tubing, the hooks may be directly attached thereto, as by welding.

Figure 7:
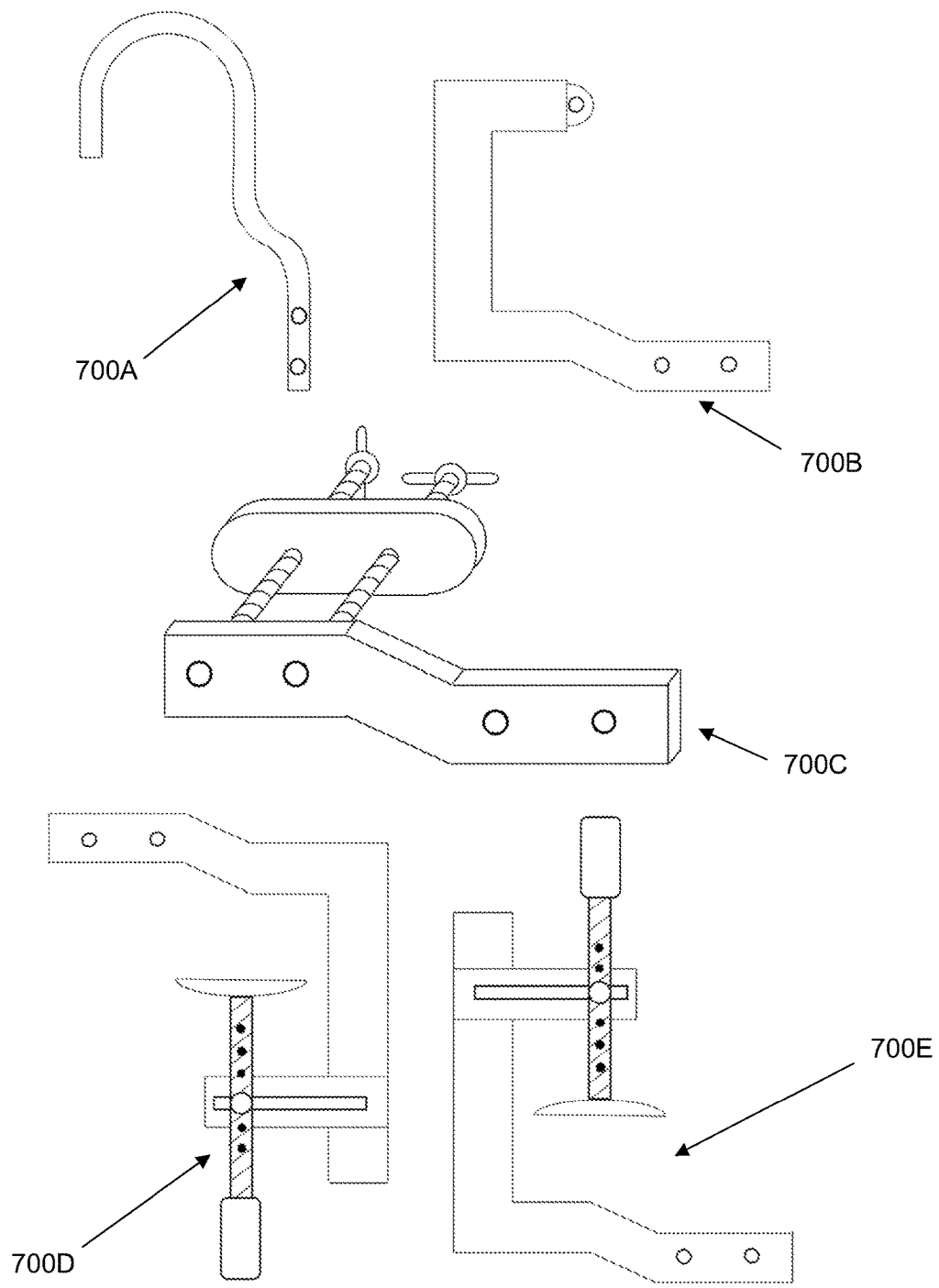
FIG. 7 depicts embodiments of different mounting hooks for use with the systems of the present disclosure.

Turning to FIG. 7, a number of different connection structures 700A though 700E are depicted. These range from simple hooks 700A and B that may be used in connection with straps S to hooks that include clamping structures, whether separate elements that are bolted to the hooks, as depicted at 700C, or elements that include a threaded rod that allows for a securing connection to be made to the rack. Such embodiments may eliminate the need for a separate strap.

For use, a bow may be placed in the carrier 10, through the open top 101 and into the gap 206 between the oppositely mounted cushioning lining. As the bow is moved into the gap 206, the lining is compressed and retains the bow securely therein. The lining then serves to pad and cushion the bow during transport. In some embodiments, the linings may secure the bow above the bottom 110 and keep it from moving as the ATV is operated. A user then can quickly retrieve the bow by simply removing it from the carrier 10 through the open top 101.

While this disclosure has been described using certain embodiments, it can be further modified while keeping within its spirit and scope. This application is therefore intended to cover any variations, uses, or adaptations of the disclosure using its general principles. Further, this application is intended to cover such departures from the present disclosure as come within known or customary practices in the art to which it pertains and which fall within the limits of the appended claims.

What is claimed is:

1. A system for carrying a bow on an ATV, the system comprising:
    a box with opposite front and rear faces, an open top at an upper end and a closed bottom end, wherein the front and rear faces each have a generally trapezoidal shape such that the box tapers from the open top to a narrower bottom end with two opposite side faces that angle apart from the bottom end to the open top;
    a first layer of a cushioning material disposed on an interior surface of the front face;
    a second layer of a cushioning material disposed on an interior surface of the rear face, such that a bow storage space is defined between the first layer of cushioning material and the second layer of cushioning material;
    a flap attached to the box adjacent the open top along one edge of the open top, the flap comprising a flexible membrane sized and configured to be drawn across the open top to close the open top during use; and
    at least a first attachment structure disposed on the rear surface, the at least first attachment structure configured for attachment to an edge of a rack disposed on an ATV such that upon attachment to the rack, the box is attached to the edge of the rack with the rear face adjacent to the edge of the rack.

2. The system of claim 1, wherein the box has an internal framework to which the front, rear and side faces are attached.

3. The system of claim 2, wherein the front, rear and side faces are formed from sheets of plywood material.

4. The system of claim 1, further comprising a layer of protective material disposed on the front, rear, and side faces of the box.

5. The system of claim 1, wherein the first layer of a cushioning material comprises a compressible foam.

6. The system of claim 5, wherein the first layer of cushioning material is attached to the interior surface of the first face along a line adjacent near the open top, and has a first side facing the bow storage space and is rolled near its upper edge, so the first side is attached to the interior surface of the front face.

7. The system of claim 5, wherein the bow storage space is narrower than the width of a bow to be stored in the system, such that the bow compresses the first layer of cushioning material and the second layer of cushioning material against the respective front and rear faces of the box to retain the bow in a secure position.

8. The system of claim 1, wherein the first layer of cushioning material and the second layer of cushioning material are each covered with a suitable textile.

9. The system of claim 8, wherein the first layer of cushioning material and the second layer of cushioning material are each covered with a suitable textile by being covered with a single textile that forms a pouch in the bow storage space.

10. The system of claim 1, wherein the flap is attached to the box along the open top adjacent the rear face.

11. The system of claim 1, wherein the flap is formed from a textile material.

12. The system of claim 1, wherein the at least a first attachment structure comprises a plurality of hooks that are disposed on the rear surface and at least a first strap for securing the box to a second point on the ATV.

13. A bow carrier system for attachment to a rack on an ATV, the system comprising:
   a generally trapezoidal box with opposite front and rear faces, an open top at an upper end and a closed bottom end;
   a first layer of a cushioning material disposed on an interior surface of the front face;
   a second layer of a cushioning material disposed on an interior surface of the rear face, such that a bow storage space is defined between the first layer of cushioning material and the second layer of cushioning material;
   a flexible membrane attached to the box along one edge of the open top, the flexible membrane sized and configured to be drawn across the open top to close the open top during use; and
   at least a first mounting hook disposed on the rear surface of the box, in a position that when the at least first mounting hook is attached to a rack disposed on an ATV, the box is attached to an edge of the rack with the rear face adjacent to the edge of the rack.

14. The system of claim 13, wherein the box has an internal framework to which the front, rear and side faces are attached.

15. The system of claim 13, wherein the first layer of a cushioning material and the second layer of cushioning material each comprise a compressible foam.

16. The system of claim 15, wherein the first layer of cushioning material is attached to the interior surface of the first face along a line adjacent near the open top, and has a first side facing the bow storage space and is rolled near its upper edge, so the first side is attached to the interior surface of the front face.

17. The system of claim 13, wherein the bow storage space is narrower than the width of a bow to be stored in the system, such that the bow compresses the first layer of cushioning material and the second layer of cushioning material against the respective front and rear faces of the box to retain the bow in a secure position.

18. The system of claim 13, wherein the first layer of cushioning material and the second layer of cushioning material are each covered with a suitable textile by being covered with a single textile that forms a pouch in the bow storage space.

19. The system of claim 13, wherein the at least a first attachment structure comprises a plurality of hooks that are disposed on the rear surface and at least a first strap for securing the box to a second point on the ATV.

20. The system of claim 13, wherein the at least a first attachment structure comprises a plurality of hooks having counterpart clamps that are disposed on the rear surface of the box.

* * * * *